US009491183B1

(12) United States Patent
Dippenaar

(10) Patent No.: US 9,491,183 B1
(45) Date of Patent: Nov. 8, 2016

(54) GEOGRAPHIC LOCATION-BASED POLICY

(71) Applicant: Amazon Technologies, Inc., Reno, NV (US)

(72) Inventor: Andries Petrus Johannes Dippenaar, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 13/906,831

(22) Filed: May 31, 2013

(51) Int. Cl.
*G06F 21/00* (2013.01)
*H04L 29/06* (2006.01)
*G06F 21/32* (2013.01)
*G06F 21/41* (2013.01)
*G06F 21/33* (2013.01)

(52) U.S. Cl.
CPC ............. *H04L 63/107* (2013.01); *G06F 21/00* (2013.01); *G06F 21/32* (2013.01); *G06F 21/335* (2013.01); *G06F 21/41* (2013.01)

(58) Field of Classification Search
CPC .... G06F 21/00; G06F 21/335; G06F 21/577; G06F 21/41; G06F 21/32; G06F 2221/2111; G06F 2221/2115; H04L 63/10; H04L 63/0807; H04L 63/107
USPC ........................................ 726/1, 2, 3, 5, 8, 9
See application file for complete search history.

(56) References Cited

U.S. PATENT DOCUMENTS

| | | | | |
|---|---|---|---|---|
| 8,549,584 B2 * | 10/2013 | Singh | ...................... | H04L 63/08 713/182 |
| 2006/0128397 A1 * | 6/2006 | Choti et al. | ................ | 455/456.1 |
| 2008/0271109 A1 * | 10/2008 | Singh | ...................... | H04L 63/08 726/1 |
| 2011/0148633 A1 * | 6/2011 | Kohlenberg | ............ | G06F 21/30 340/541 |
| 2011/0202269 A1 * | 8/2011 | Reventlow | ..................... | 701/201 |
| 2012/0284779 A1 * | 11/2012 | Ingrassia et al. | .................. | 726/5 |
| 2013/0132854 A1 * | 5/2013 | Raleigh et al. | ............... | 715/738 |
| 2013/0219458 A1 * | 8/2013 | Ramanathan | ...................... | 726/1 |
| 2014/0007182 A1 * | 1/2014 | Qureshi et al. | .................... | 726/1 |
| 2014/0189785 A1 * | 7/2014 | Castro | ................... | H04L 63/105 726/1 |
| 2014/0189786 A1 * | 7/2014 | Castro | ................... | H04L 63/105 726/1 |
| 2014/0189808 A1 * | 7/2014 | Mahaffey et al. | ................ | 726/4 |

* cited by examiner

*Primary Examiner* — Don Zhao
(74) *Attorney, Agent, or Firm* — Baker & Hostetler LLP

(57) ABSTRACT

In a computing environment a request is received from a computing device associated with a user, requesting access to one or more computing resources. An approximate geographic location of the computing device is determined based on geographic information associated with the computing device. Access to the requested one or more computing resources is allowed based on the approximate geographic location of the computing device and geographic policy information for the user.

19 Claims, 8 Drawing Sheets

GEOGRAPHIC LOCATION-BASED POLICY

BACKGROUND

Computer crime has continuously increased with the growth of Internet commerce and networked communications. With the growth of communication networks such as the Internet, the increasing amount of data interchange and the recent growth of cloud computing, the vulnerability of computers and servers through networked communication has become an increasingly significant issue. Furthermore, many organizations and businesses operate and maintain data centers to provide computing and information services to support their day-to-day operations. Data centers also provide computing services to businesses and individuals as a remote computing service or to provide software as a service. The services provided by data centers are extremely important to businesses as the continued and reliable availability of the computing services are important to the business's ongoing operations. It is thus necessary to provide reliable and secure computing services in order to minimize disruptions to customers of the computing services. Security is an important concern not only for service reliability but also for the protection of a customer's personal and proprietary information. A data center must therefore implement a secure computing environment in order to provide such protections. Services that control access to systems and data stored thereon must avoid allowing access to hackers and other unauthorized users, while allowing legitimate users to access the services and data.

A login mechanism is typically used to control access to a wide variety of information systems. The username and password-based login process is one common type of login service. When using this process, a user typically presents a username and a secret password to provide evidence that they are the authorized owner of an identity associated with the username. An unauthorized user may attempt to gain unauthorized access by guessing the username and/or secret password or by other means. An unauthorized user may also attempt to gain unauthorized access if the legitimate user's mobile phone, tablet or laptop is stolen or accessed without permission. The legitimate user's device may have accounts and online purchase options configured, and the unauthorized user may incur unauthorized expenses or attempt to access the legitimate user's remote services. The login service may attempt to prevent such illegitimate uses by making login attempts more difficult to compromise. However, such attempts may unnecessarily impact legitimate users.

DETAILED DESCRIPTION

In various embodiments described further in this disclosure, location-based information and services are used to determine how a user may access computing resources. For example, geographic information can be used to provide security and protection of data and systems and/or implement various policy requirements. In one embodiment, the geographic location of a user's computing device may be used to trigger or activate one or more security features associated with the user's data or other computing resources. For example, a user may establish a policy providing that online purchases may only be allowed from a device connected to the user's home WiFi network. As another example, the user may establish a policy that disallows digital content purchases outside of the user's country of residence. The security features may include other restrictions in addition to allowing/denying actions. For example, the location of the computing device may trigger an additional verification step, such as entry of a password or some other challenge-response function. The location-based security features described herein may apply not only to online transactions but any situation in which a user attempts to remotely access data and services and in which it is desirable to verify that the attempt access is legitimate based on a geographic location of the device being used to request the access.

Figure 1:
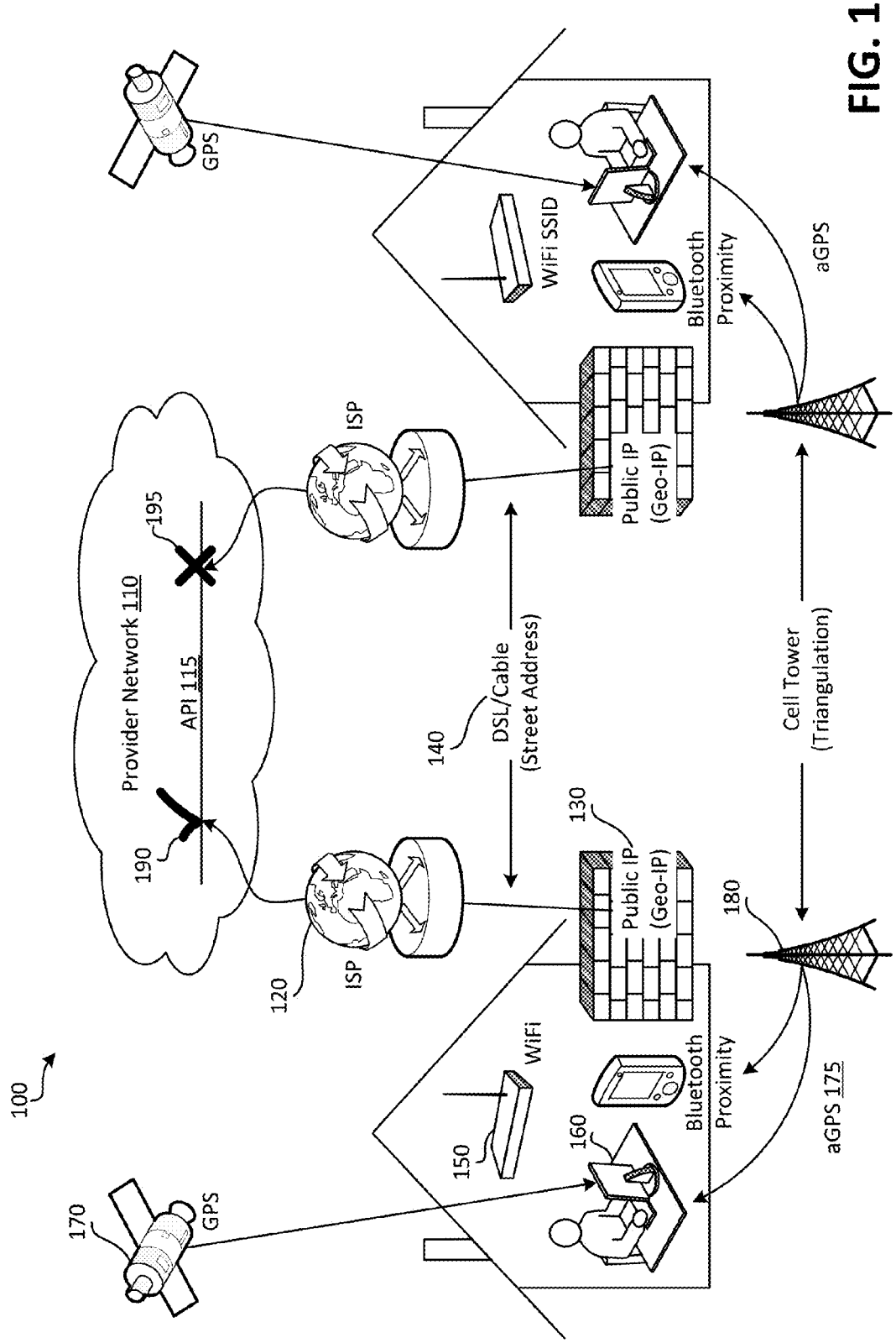
FIG. 1 is a diagram illustrating a location-based policy mechanism in accordance with the present disclosure.

These and other aspects and embodiments of the present invention will now be described in greater detail. FIG. 1 illustrates one embodiment of a system 100 for providing location-based security in accordance with the present disclosure. In one embodiment a provider network 110 may provide computing resources to customers. Networks established by or on behalf of an entity, such as a company or organization, to provide one or more services (such as various types of cloud-based computing or storage) accessible via the Internet and/or other networks to a distributed set of clients may be termed provider networks. Such a provider network may include one or more data centers hosting various resource pools, such as collections of physical and/or virtualized computer servers, storage devices, networking equipment and the like, that may be used to implement and distribute the infrastructure and services offered by the provider network. While this example illustrates a provider network, the principles described herein may be implemented in any type of network where services are accessible via the Internet and/or other networks to users.

The provider network 110 may expose an application programming interface (API) 115 for receiving data over a network from various Internet service providers (ISPs) 120. In some embodiments, the source location of data received via the API may be used to determine a geographic location of the requesting computing device 160. For example, Internet Protocol (IP) address location data 130 can be used to estimate the geographic location of the requesting computing device 160. Based on the source IP address, the source country, city and/or postal code may be determined. In some cases, the DSL or cable service provider 140 may provide customer information that can be used to locate the source to a physical address. In other embodiments, the provider network 110 may receive data without the use of an API. Additionally or optionally, the API may query whether an IP address is located within a proximity to a geo-location.

For example, in the case where a user has provided a home address as well as the user's cable/DSL provider, the query may be "Is this IP within 40 meters of 1600 Pennsylvania Ave?"

Wireless access point 150 may also provide location information by using, for example, localization techniques for determining the position of a connected device based on signal strength. In some cases the exact location of a fixed access point may be known and used to further determine the location of the requesting computing device 160. Additionally, many devices have Global Positioning Service (GPS) capability or other satellite-based location determination functionality. Such devices may be capable of determining a geographic location based on GPS satellite (or other satellite) communications 170. In some cases, assisted GPS (aGPS) 175 may be used to improve the location determination. Some devices, such as smartphones, may communicate with cell towers 180 to determine a geographic location using techniques such as Time Difference of Arrival (TDOA).

Based on the geographic location information, the provider network may determine an approximate geographic location of the user computer 160 and access the relevant location-based policies for the user. Based on the policies and the determined approximate geographic location, the provider network 110 may allow 190 a request for accessing resources provided by provider network 110 that are associated with the user. If the conditions defined by the location-based policies for the user are not met, then the provider network 110 may deny 195 the request for accessing resources provided by provider network 110 that are associated with the user.

The above described location determination techniques are provided as examples and are not intended to limit the scope of location determination techniques that may be used in conjunction with the disclosed embodiments. Any technique for providing geographic location information for a user computing device may be used. Additionally, the provider network may access other information and services that are available to the provider network and can further support location determination capability. For example, the provider network may implement content distribution functions that maintain a database of locations based on IP addresses. Furthermore, one or more geographic location determination techniques may be combined to provide additional accuracy and confidence in the geographic location information. In some cases, the geographic location information may be provided by the user computing device. In some embodiments, such a self-reported location may be weighted less than other sources because of the possibility that the reported location may be modified. Geographic location information that can be independently verified by the provider network may be assigned a higher weight, or may be used at the exclusion of self-reported geographic location information.

Figure 2:
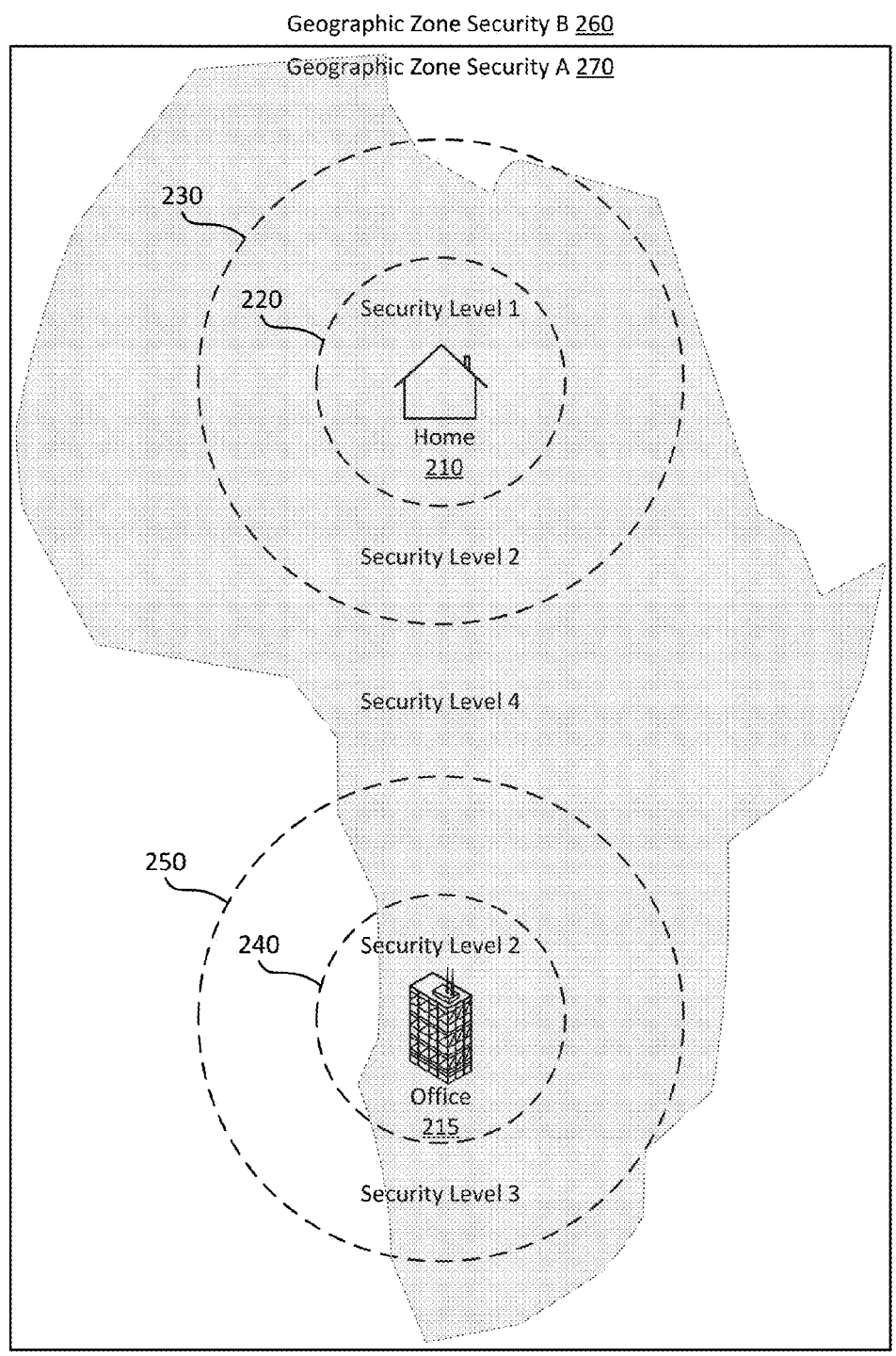
FIG. 2 illustrates an example of a location-based policy mechanism in accordance with the present disclosure.

Referring now to FIG. 2, illustrated is one embodiment of a location-based security implementation in accordance with the present disclosure. By way of example, a user may establish location-based security preferences for two locations—the user's home 210 and the user's office 215. The user may further establish two location-based security preferences for home 210—security level 1 based on a first proximity 220 relative to home 210, and security level 2 based on a second proximity 230 relative to home 210 that is greater than the first proximity. The user may establish security level 1 to define security preferences when interactions originate from a device located in the first proximity.

Typically, the user may allow more permissive policies when in the first proximity. For example, the user may establish a security level 1 policy that states: "If I am logging in to my user account from outside my home, trigger the additional one-time password authentication." The user may establish a different set of policies for the second proximity. For example, the user may establish a security level 2 policy that states: "Do not allow any changes to my account or any transactions in proximity 2." As discussed above, the policies may not be strictly location-based. For example, security level 1 may be based on the status of the user's computing device with respect to a wireless network in home 210. The security level 1 policy may state in this case that: "If I am logging in to my user account from outside my home WiFi network, trigger the additional one-time-password authentication."

Similarly, the user may establish a security level to define security preferences when interactions take place from a device located in the first proximity 240 from office 215. In this example, the user has established the same security level 2 as established for proximity 230 relative to home 210. The user may establish different policies for the second proximity 250 relative to office 215. For example, the user may establish a security level 3 policy that states: "Only allow remote access API calls from my office network."

In some embodiments, additional location-based security policies may be established. For example, referring to FIG. 2, a first geographic zone security A (270) may be established when the user's device is determined to be in a geographic region such as a country or continent. The user may establish additional security policies, such as a second geographic zone security B (260), when the user's device is determined to be outside of a geographic region, such as a country or continent.

Additionally or optionally, location-based security policies may include implementation of regulations or policies that regulate actions related to software and/or data based on a geographic location. For example, the policies may implement legislative or regulatory policies/requirements such as International Traffic in Arms Regulations (ITAR). Such policies/requirements may regulate the import and export of certain technologies that may be implemented in software or data. The policies may also implement private policies within a company or organization, such as implementation of a company policy that certain data can only be submitted or accessed from predefined geographic locations.

In one embodiment, the provider network my incentivize certain user behaviors based on geographic location-based policies. For example, the provider network may encourage customer adoption of geographic location security policies by offering incentives, e.g., if a user adds a protective geographic location security policy to their account, the provider network may provide compensation in the event of account compromise/identify theft.

The location of a user computing device can be determined by a number of methods, either alone or in combination. For example, mobile devices may be located using cell tower/base station triangulation techniques or based on association with WiFi networks with known locations of access points. Devices may be embedded with a GPS/GLONASS or may be connected to a GPS/GLONASS transceiver allowing for determination of the device's location.

Figure 3:
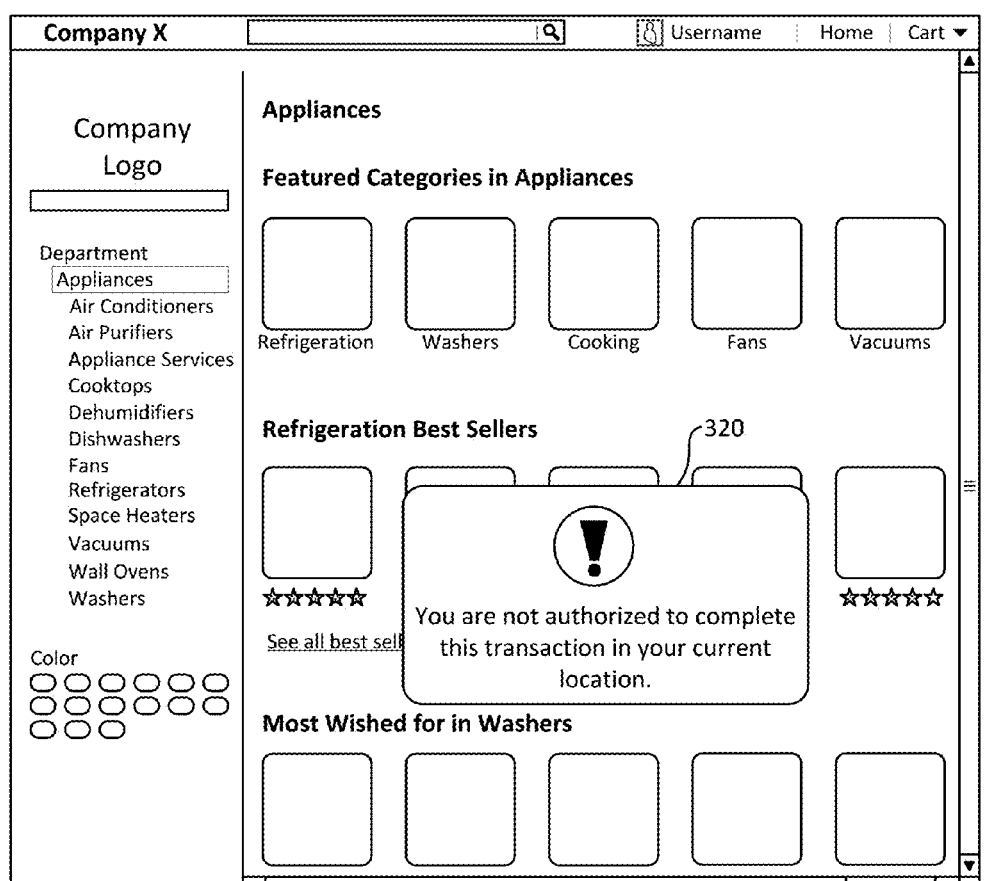
FIG. 3 is a diagram illustrating an example user interface in accordance with the present disclosure.

Referring to FIG. 3, illustrated is a user interface depicting an example response to a user request for online access to resources based on a determined geographic location of the user computer from which the user request originates.

For example, as shown in FIG. 3, a user interface 300 may be provided to the user in a window 310 of a Web browser or other client application executing on the user computing device, such as user computing device 160 of FIG. 1. In this example, an online purchase transaction on a shopping site is depicted, where the user has logged into the user's online account, has selected an item for an online purchase and has requested initiation of the purchase transaction. If the user has established a location-based policy, such as security level 2 policy of FIG. 2, and if the user or an unauthorized person attempts to initiate the purchase transaction and such actions are restricted by the location based policy, the purchase transaction may be denied and a message window such as warning 320 may be displayed, indicating that the transaction has been denied based on the current location.

Figure 4:
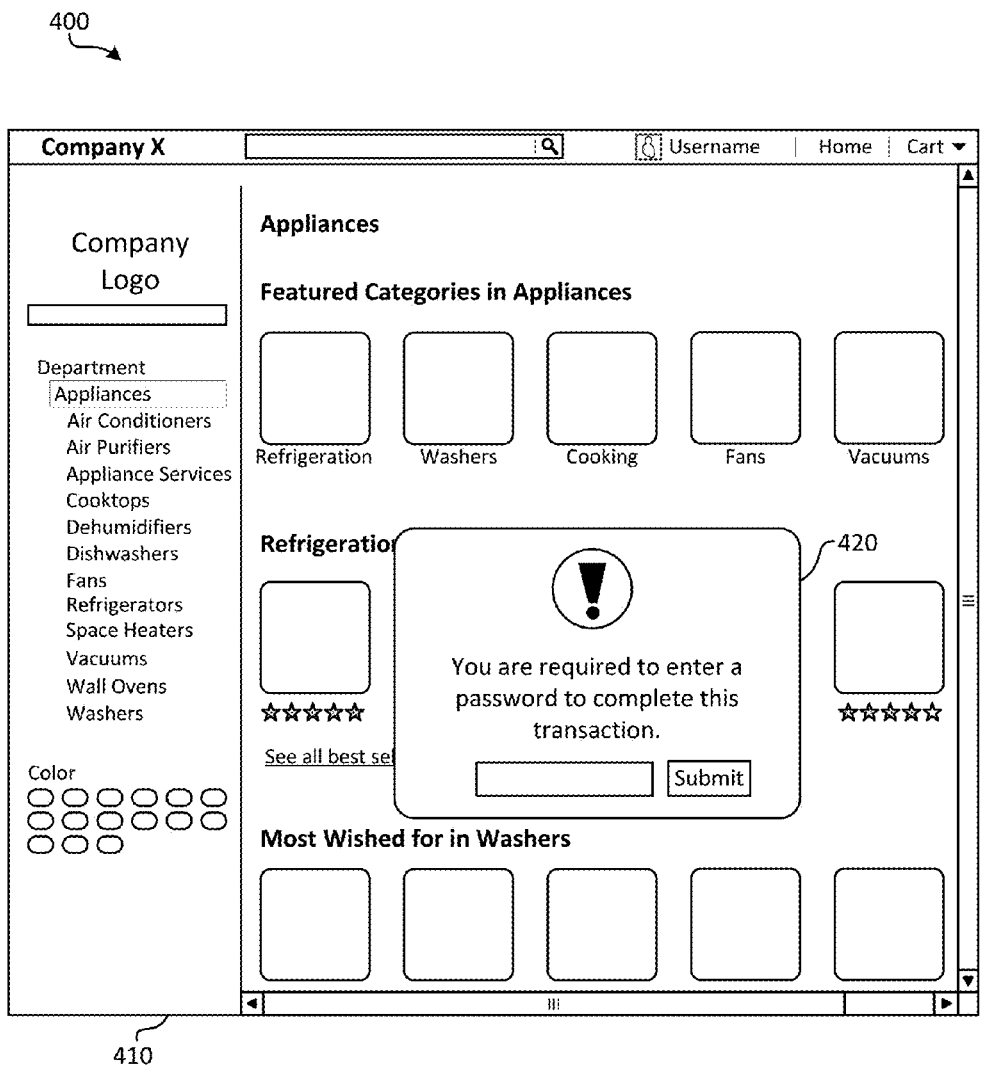
FIG. 4 is a diagram illustrating an example user interface in accordance with the present disclosure.

Referring to FIG. 4, illustrated is another user interface depicting an example response to a user request for online access to resources based on a determined geographic location of the user computer from which the user request originates. For example, as shown in FIG. 4, a user interface 400 may be provided to the user in a window 410 of a Web browser or other client application executing on the user computing device, such as user computing device 160 of FIG. 1. In this example, an online purchase transaction on a shopping site is depicted, where the user has logged into the user's online account, selected an item for an online purchase and has requested initiation of the purchase transaction. If the user has established a location-based policy, such as security level 1 policy of FIG. 2, and if the user or an unauthorized person attempts to initiate actions that are restricted by the location-based policy, then a window 420 may be provided that prompts for input of a password in order to continue with the transaction.

Figure 5:
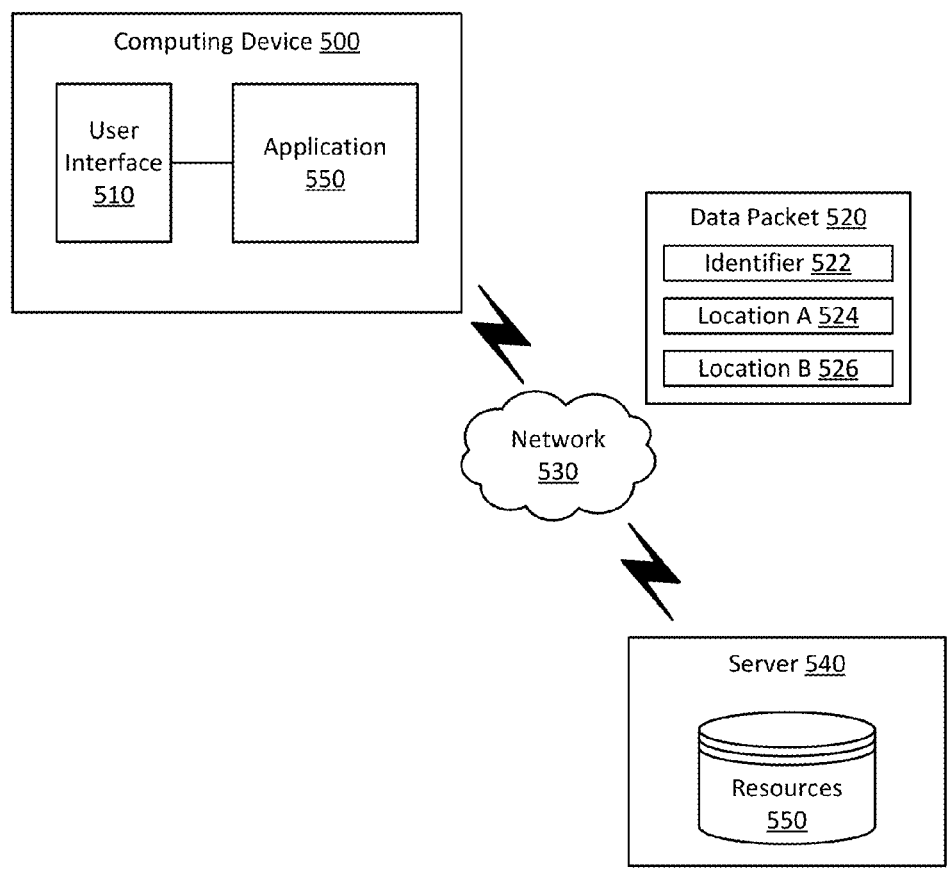
FIG. 5 is a block diagram illustrating an example computer system that may be used in some embodiments.

FIG. 5 illustrates one embodiment of a system for providing location-based security in accordance with the present disclosure. The system comprises a computing device 500 and a server 540. The computing device 500 communicates with the server 540 via a communications network 530. The computing device 500 includes an application 550 and a user interface 510. The server 540 may provide access to resources 550 that may be accessed by a user operating computing device 500.

The computing device 500 can be a smartphone, a personal computer, laptop or any other computing device that includes wired or wireless communication capabilities. The application 550 can be any software application that executes on computing device 500, such as a Web browser. Application 550 may use user interface 510 to communicate with the user of wireless device 500.

Figure 6:
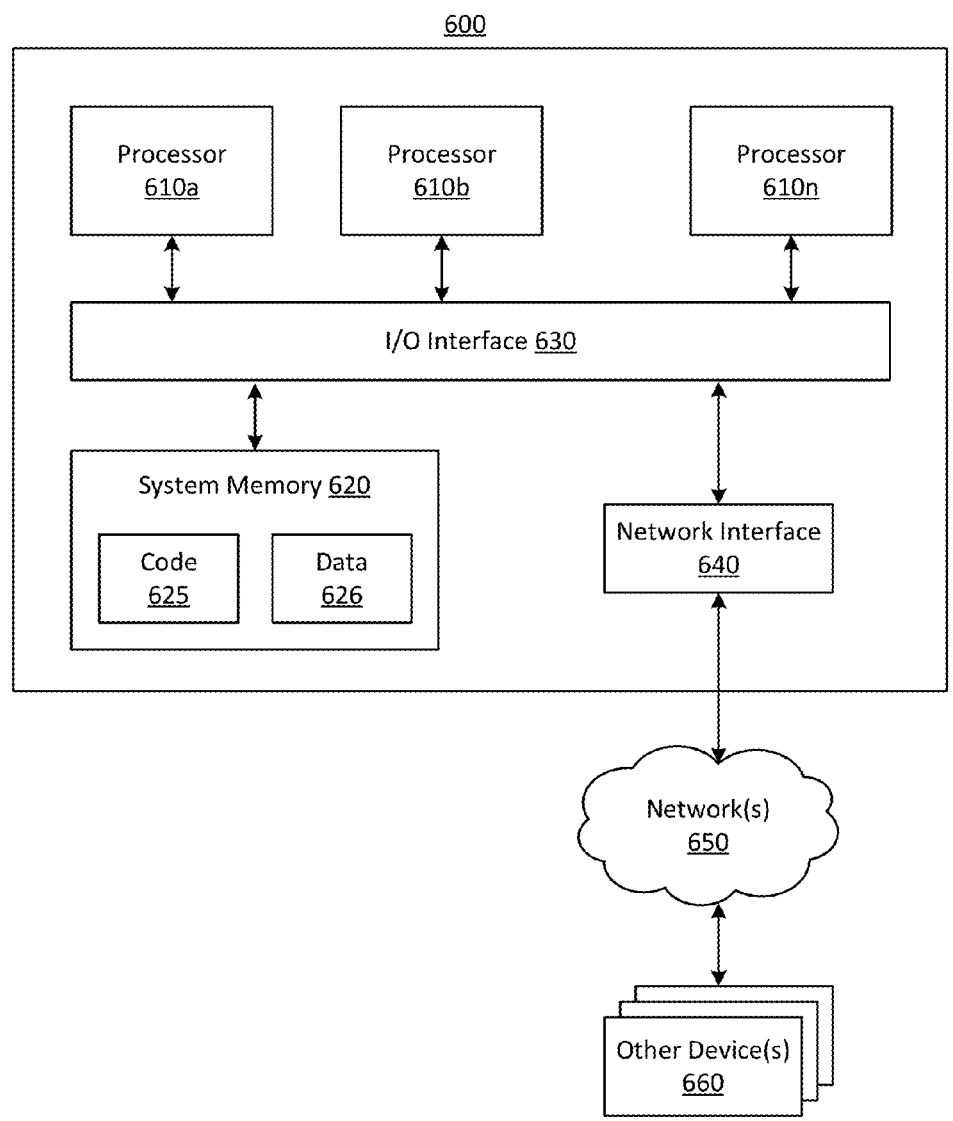
FIG. 6 is a block diagram illustrating an example computer system that may be used in some embodiments.

In at least some embodiments, a server that implements a portion or all of one or more of the technologies described herein, including the techniques to implement the functionality of a location-based security system may include a general-purpose computer system that includes or is configured to access one or more computer-accessible media. FIG. 6 illustrates such a general-purpose computing device 600. In the illustrated embodiment, computing device 600 includes one or more processors 610a, 610b and/or 610n (which may be referred herein singularly as "a processor 610" or in the plural as "the processors 610") coupled to a system memory 620 via an input/output (I/O) interface 630. Computing device 600 further includes a network interface 640 coupled to I/O interface 630.

In various embodiments, computing device 600 may be a uniprocessor system including one processor 610 or a multiprocessor system including several processors 610 (e.g., two, four, eight or another suitable number). Processors 610 may be any suitable processors capable of executing instructions. For example, in various embodiments, processors 610 may be general-purpose or embedded processors implementing any of a variety of instruction set architectures (ISAs), such as the x86, PowerPC, SPARC, or MIPS ISAs or any other suitable ISA. In multiprocessor systems, each of processors 610 may commonly, but not necessarily, implement the same ISA.

System memory 620 may be configured to store instructions and data accessible by processor(s) 610. In various embodiments, system memory 620 may be implemented using any suitable memory technology, such as static random access memory (SRAM), synchronous dynamic RAM (SDRAM), nonvolatile/Flash-type memory or any other type of memory. In the illustrated embodiment, program instructions and data implementing one or more desired functions, such as those methods, techniques and data described above, are shown stored within system memory 620 as code 625 and data 626.

In one embodiment, I/O interface 630 may be configured to coordinate I/O traffic between processor 610, system memory 620 and any peripheral devices in the device, including network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computing device 600 and other device or devices 630 attached to a network or networks 650, such as other computer systems or devices as illustrated in FIGS. 1 through 6, for example. In various embodiments, network interface 640 may support communication via any suitable wired or wireless general data networks, such as types of Ethernet networks, for example. Additionally, network interface 640 may support communication via telecommunications/telephony networks such as analog voice networks or digital fiber communications networks, via storage area networks such as Fibre Channel SANs or via any other suitable type of network and/or protocol.

In some embodiments, system memory 620 may be one embodiment of a computer-accessible medium configured to store program instructions and data as described above for FIGS. 1 and 2 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 600 via I/O interface 630. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 600 as system memory 620 or another type of memory. Further, a computer-accessible medium may include transmission media or signals such as electrical, electromagnetic or digital signals, conveyed via a communication medium, such as a network and/or a wireless link, such as may be implemented via network interface 640. Portions or all of multiple computing devices such as those illustrated in FIG. 5 may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A network set up by an entity such as a company or a public sector organization to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications, and schedule execution of the applications on behalf of the client on execution platforms (such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a datacenter or other geographic location of the underlying computing hardware, for example.

Figure 7:
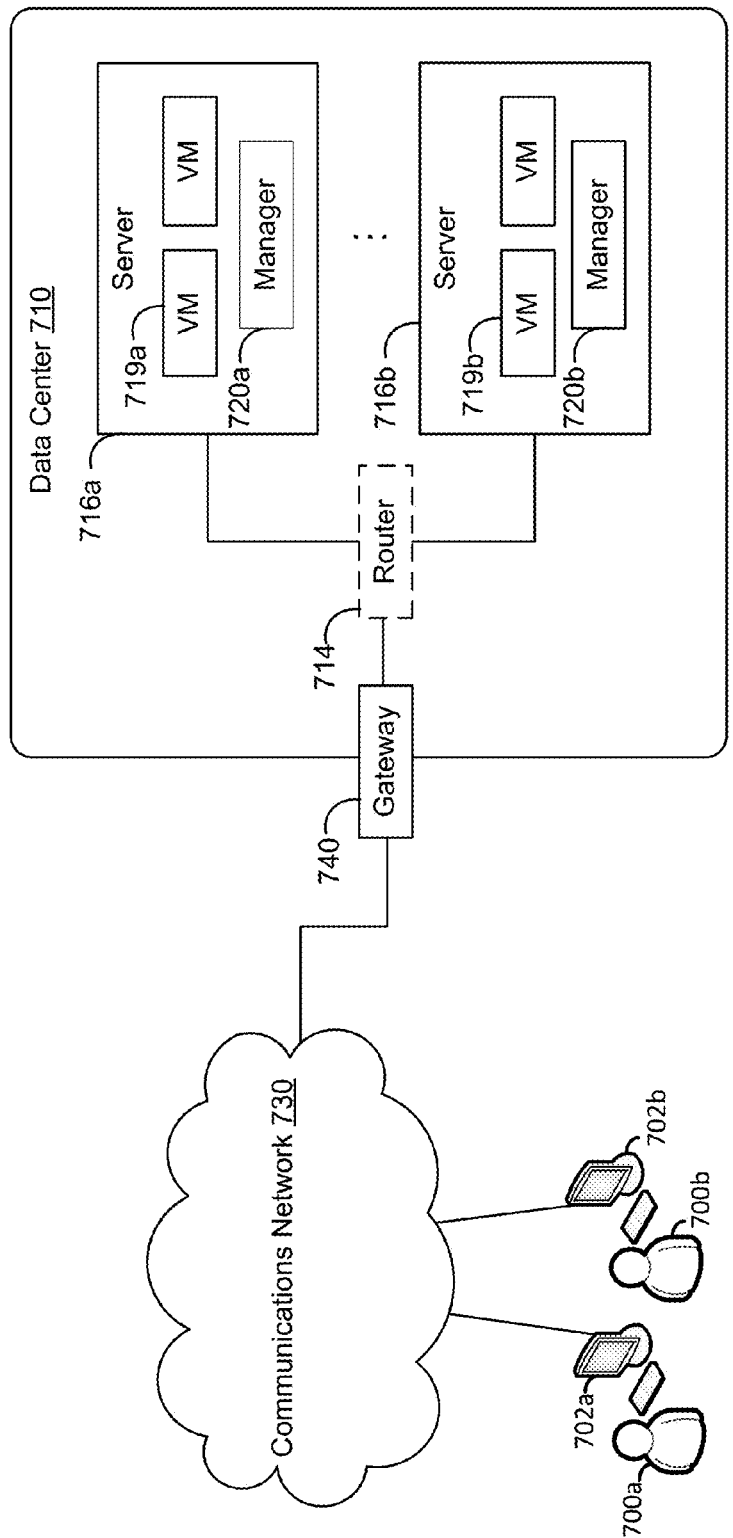
FIG. 7 is a block diagram illustrating an example computer system that may be used in some embodiments.

FIG. 7 depicts an example computing environment wherein aspects of the present disclosure can be implemented. Referring to FIG. 7, communications network 730 may, for example, be a publicly accessible network of linked networks and possibly operated by various distinct parties, such as the Internet. In other embodiments, communications network 730 may be a private network, such as, for example, a corporate or university network that is wholly or partially inaccessible to non-privileged users. In still other embodiments, communications network 730 may include one or more private networks with access to and/or from the Internet.

Communication network 730 may provide access to computers 702. User computers 702 may be computers utilized by customers 700a and 700b or other customers of data center 710. For instance, user computer 702a or 702b may be a server, a desktop or laptop personal computer, a tablet computer, a wireless telephone, a personal digital assistant (PDA), an e-book reader, a game console, a set-top box or any other computing device capable of accessing data center 710. User computer 702a or 702b may connect directly to the Internet (e.g., via a cable modem or a Digital Subscriber Line (DSL)). Although only two user computers 702a and 702b are depicted, it should be appreciated that there may be multiple user computers.

User computers 702 may also be utilized to configure aspects of the computing resources provided by data center 710. In this regard, data center 710 might provide a Web interface through which aspects of its operation may be configured through the use of a Web browser application program executing on user computers 702. Alternatively, a stand-alone application program executing on user computers 702 might access an application programming interface (API) exposed by data center 710 for performing the configuration operations. Other mechanisms for configuring the operation of the data center 710, including deploying updates to an application, might also be utilized.

Servers 716a and 716b, shown in FIG. 7, may be standard servers configured appropriately for providing the computing resources described above and may provide computing resources for executing one or more applications. In one embodiment, the computing resources may be virtual machine instances 719a and/or 719b. In the example of virtual machine instances 719, each of the servers 716 may be configured to execute an instance manager 720a or 720b capable of executing the virtual machine instances 719. The instance managers 720 may be a virtual machine monitor (VMM) or another type of program configured to enable the execution of virtual machine instances 719 on servers 716, for example. As discussed above, each of the virtual machine instances 719 may be configured to execute all or a portion of an application.

It should be appreciated that this example describes a computing environment providing virtual machine instances, other types of implementations can be utilized with the concepts and technologies disclosed herein. For example, the embodiments disclosed herein might also be utilized with computing systems that do not utilize virtual machine instances.

In the example data center 710, shown in FIG. 7, a router 714 may be utilized to interconnect the servers 716a and 716b. Router 714 may also be connected to gateway 740 which is connected to communications network 730. Router 714 may manage communications within networks in data center 710, for example by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In some embodiments, one or more of the virtual machine instances 719 of data center 710 may form part of one or more networks. In some embodiments, gateway 740 may be used to provide network address translation (NAT) functionality to a group of virtual machine instances and allow the virtual machine instances of the group to use a first group of internal network addresses to communicate over a shared internal network and to use a second group of one or more other external network addresses for communications between virtual machine instances of the group and other computing systems or virtual machine instances that are external to the group. An IP address is one example of a network address that is particularly applicable to the TCP/IP context in which some embodiments of the present disclosure can be implemented. The use of IP addresses herein is intended to be illustrative of network addresses and not limiting as to the scope of the described concepts.

Virtual machine instances 719 may be assigned a private network address (not shown). For example, the private network addresses may be unique with respect to their respective private networks but not guaranteed to be unique with respect to other computing systems that are not part of the private network. IP addresses are used to illustrate some example embodiments in the present disclosure. However, it should be understood that other network addressing schemes may be applicable and are not excluded from the scope of the present disclosure.

Gateway 740 may operate to manage both incoming communications to data center 710 from communication network 730 and outgoing communications from data center 710 to communication network 730. For example, if virtual machine instance 719a sends a message (not shown) to computer 702a, virtual machine instance 719a may create an outgoing communication that includes network address on a first network (e.g., an external public IP address) for computer 702a as the destination address and include a network address on a second network (e.g., a private IP address) for virtual machine instance 719a as the source network address. Router 714 may then use the destination address of the outgoing message to direct the message to gateway 740 for handling. In particular, in order to allow computer 702a to reply to the outgoing message, gateway 740 may temporarily map one of the public network addresses for data center 710 to virtual machine instance 719a and modify the outgoing message to replace the private network address for the source network address with the mapped public network address. Gateway 740 may then update its mapping information with the new mapping, and forward the modified outgoing message to computer 702a over the Internet.

If computer 702a responds to the modified outgoing message by sending a response incoming message (not shown) that uses the mapped public network address for virtual machine instance 719a as the destination network address, the response incoming message may be directed over the Internet to gateway 740. Gateway 740 may then perform similar processing in reverse to that described above for the outgoing message. In particular, gateway 740 may use its mapping information to translate the mapped public network address into the private network address of virtual machine instance 719a, modify the destination network address of the response incoming message from the mapped public network address to the private network address of virtual machine instance 719a and forward the modified incoming message to virtual machine instance 719a. In this manner, at least some of the internal computers of data center 710 may communicate with external computing systems via temporary use of the public network addresses. Furthermore, in some situations, one or more of the internal computing systems of data center 710 may be mapped to use one of the public network addresses (e.g., to a unique combination of a public network address and a port number), such that external computing systems may initiate new incoming messages to the internal computing system by directing the new incoming messages to the mapped representative public network address/port as the destination network address of the new incoming messages.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 710 described in FIG. 7 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

It will be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

In some embodiments, a system memory may be used which is one embodiment of a computer readable storage medium configured to store program instructions and data as described above for FIGS. 1-7 for implementing embodiments of the corresponding methods and apparatus. However, in other embodiments, program instructions and/or data may be received, sent or stored upon different types of computer-accessible media. Generally speaking, a computer readable storage medium may include non-transitory and tangible storage media or memory media such as magnetic or optical media, e.g., disk or DVD/CD coupled to a computer system or gateway device. A computer readable storage medium may also include any volatile or non-volatile media such as RAM (e.g. SDRAM, DDR SDRAM, RDRAM, SRAM, etc.), ROM, etc., that may be included in some embodiments of the computer systems described above as system memory, gateway device, or another type of memory. Portions or all of the multiple computer systems such as those illustrated herein may be used to implement the described functionality in various embodiments; for example, software components running on a variety of different devices and servers may collaborate to provide the functionality.

It will be appreciated that in some embodiments the functionality provided by the routines discussed above may be provided in alternative ways, such as being split among more routines or consolidated into fewer routines. Similarly, in some embodiments, illustrated routines may provide more or less functionality than is described, such as when other illustrated routines instead lack or include such functionality respectively or when the amount of functionality that is provided is altered. In addition, while various operations may be illustrated as being performed in a particular manner (e.g., in serial or in parallel) and/or in a particular order, in other embodiments the operations may be performed in other orders and in other manners. Similarly, the data structures discussed above may be structured in different ways in other embodiments, such as by having a single data structure split into multiple data structures or by having multiple data structures consolidated into a single data structure, and may store more or less information than is described (e.g., when other illustrated data structures instead lack or include such information respectively, or when the amount or types of information that is stored is altered).

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some or all of the elements in the list.

Figure 8:
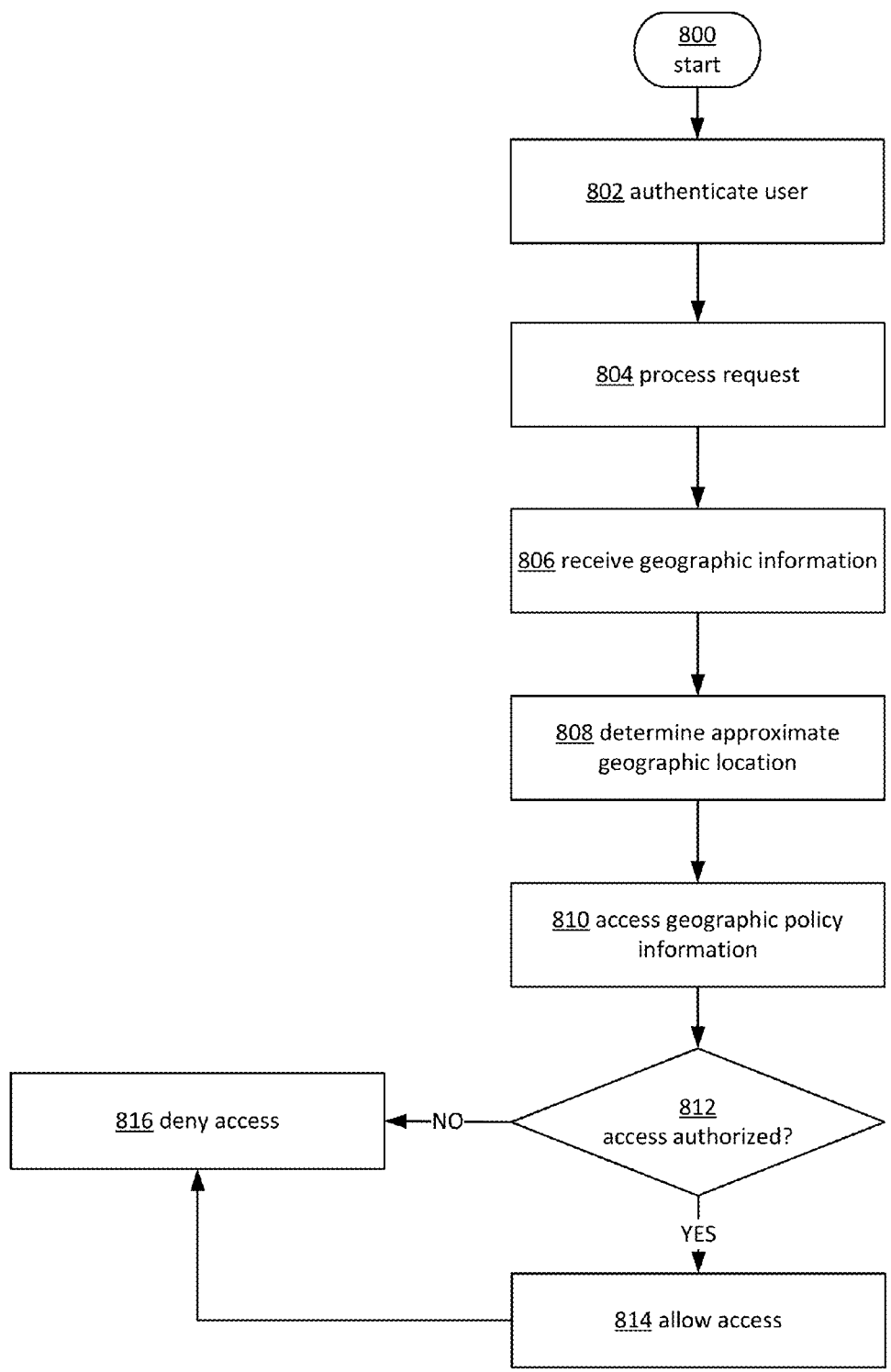
FIG. 8 is a flowchart of one embodiment of a process for providing a location-based security mechanism in accordance with the present disclosure.

FIG. 8 illustrates an example operational procedure for providing location based security as described herein. In an embodiment, aspects of the operational procedure may be provided by a data center, such as data center 710 of FIG. 7, or a provider network such as provider network 110 of FIG. 1. At least a portion of the operational procedure may be implemented in a system comprising one or more computing nodes. Referring to FIG. 8, operation 800 begins the operational procedure. Operation 800 may be followed by operation 802. Operation 802 illustrates authenticating a user associated with a computing device. The user may be authenticated by verifying the identity of the user by verifying presented credentials, such as a username and password. Operation 802 may be followed by operation 804. Operation 804 illustrates processing a request for access to a computing resource. The request can be for any computing resource provided by a provider network such as computing and data resources, virtual computing and the like. The resources can also include transactions such as online purchases, financial transactions and media services.

Operation 804 may be followed by operation 806. Operation 806 illustrates receiving geographic information associated with a geographic location of the computing device. In one embodiment, geographic information may be received from a plurality of sources. The user device may provide geographic information from location determination sources, such as GPS, cell towers and base stations and wireless access points. The user device's location may also be entered directly by the user in some cases. Geographic information may also be received from sources other than the user device. The geographic information may be determined based on the IP address of the user device or the service provider. In some embodiments, the provider network may, independently of the user device, receive geographic information from a secondary source, such as a location service. For example, a user may provide permission to a cell phone service provider to track the user's device using location based services and provide the information to selected recipients in conjunction with requests to access resources. A provider network may also determine geographic location based on network architecture and topology and analysis of data flows from the user's computing device.

Operation 806 may be followed by operation 808. Operation 808 illustrates determining an approximate geographic location of the computing device based at least in part on the geographic information. In most cases an exact geographic location of the user's computing device is not needed in order to provide location based security. An approximate geographic location is typically sufficient to select an appropriate location based policy. The approximate geographic location may be determined using one or more sources of geographic information. In one embodiment, a combination of geographic information sources may be used to improve the determination of the approximate geographic location.

Operation 808 may be followed by operation 810. Operation 810 illustrates accessing geographic policy information for the user. In one embodiment, the geographic policy information may be based on inputs provided by the user for the user's allocated assets or the user's account with the provider network. For example, location based security may be an optional feature that users may elect to activate for their account. In some embodiments, the provider network can charge a fee for activating the location-based security feature. As discussed above, a user interface may be provided for the user to input location-based security options. The user may select from one or more options provided by the provider network. In some embodiments, the user may enter customized location based security options using, for example, a markup language including syntax and grammar for policy elements. A user or administrator may submit, for example, a document written in XML or any machine-processable language that can be used for expressing policies related to security or how user accounts and other resources can be accessed. The provider network can process the document and implement the policies expressed in the document in accordance with the provider network's policies and procedures.

In other embodiments, the provider network may define settings for location-based security.

Operation 810 may be followed by operation 812. Operation 812 illustrates determining if the user is authorized to access the computing resource based at least in part on the approximate geographic location of the computing device and the geographic policy information. If the user is authorized to access the computing resource, then operation 812 may be followed by operation 814. Operation 814 illustrates allowing access to the computing resource in response to determining that the user is authorized. If the user is not authorized to access the computing resource, then operation 812 may be followed by operation 816. Operation 816 illustrates denying access to the computing resource.

In one embodiment, the geographic policy information may indicate that a minimum confidence level should be associated with the approximate geographic location. For example, the geographic policy information may indicate that the approximate geographic location should have an accuracy of at least a minimum threshold, such as a maximum position error. Various location determination methods may have different position errors, ranging from several meters to several miles. Some security settings may require higher accuracy, such as settings related to proximity to the user's home location. In this case, a maximum position error in the tens of meters may be desirable. On the other hand, location based security settings regarding proximity to a country or region may only require a maximum position error of tens of miles or kilometers.

The geographic policy information may indicate restrictions associated with accessing the computing resource based on the approximate geographic location. As discussed above, such restrictions may include denying a request to access data or to modify data or requiring a challenge response before allowing access to the requested resource. A challenge response may comprise the presentation of additional credentials, entering a password, answering one or more security questions, presentation of biometric data and the like. These types of restrictions can comprise any manner of restricting access to the requested computing resource.

The geographic policy information may indicate restrictions associated with accessing the computing resource based on the approximate geographic location being within a predetermined geographic perimeter. The geographic perimeter may be any geographic area selectable by the user such as a radius from a geographic point, proximity to one or more user selected locations, an arbitrary geographic border, a geographic boundary such as a county, province or country and the like. In one embodiment, the user may define a customized geographic perimeter to be used with the geographic policy. In some embodiments, the geographic perimeter may be defined in terms of a network topology. For example, the restriction can be based on whether the computing device is connected to a particular wireless access point or other network device. The restriction can also be based on whether data from the computing device is received from a known network node or device.

The user can be provided a user interface for submitting geographic policy information. In one embodiment, the user may be able to access a user interface, such as the user interface 510 depicted in FIG. 5. For example, the server 540 of FIG. 5 may present a user interface to the computing device 500 in a window of a Web browser or other client application executing on the computing device 500. The user interface may include a template or wizard for creating/submitting geographic policy information. For example, a geographic policy information request form may be provided that includes a geographic policy name, resources that are to be covered by the geographic policy, the types of restrictions that are to be applied and the geographic perimeters that are to be applied to the geographic policy. These fields are provided to illustrate examples of possible user interface options that may be provided to a customer. Additional fields may be provided, and some of the fields may be optional.

The user interface may also indicate a price for implementing the geographic policy if the provider network charges a fee for implemented the geographic policy. Based on the customer's input, the provider network may store the geographic policy and access the geographic policy when requests associated with the user are received by the provider network.

In some embodiments, an API may be provided for facilitating the submission of geographic policy information and geographic location information. The API may be configured to receive electronic messages that encode identifiers indicative of geographic policy information and geographic location information. In response to receiving one of the electronic messages, the API may send electronic messages indicative of information indicating that geographic policy information and/or geographic location information has been received and stored. An API may also be provided that can facilitate exchange of geographic location information with applications or services that may provide geographic information for user devices. For example, an API can be configured to receive geographic location data from third party applications or services that may perform location determination.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of the inventions disclosed herein.

What is claimed is:

1. A system for controlling access to computing resources provided by a plurality of computing devices of a provider network, the system comprising:
at least one computing node;
at least one memory having stored thereon computer readable instructions that, upon execution by the system, cause the system at least to:
authenticate a user associated with a computing device, the user being associated with one or more of the computing resources of the provider network;
process a request, received from the computing device, for access to one or more of the computing resources associated with the user;
receive geographic information usable to determine an approximate geographic location of the computing device;
assigning a confidence weight to the geographic information, wherein geographic information from a provider verifiable source is assigned a higher confidence weight than geographic information from other sources;
determine the approximate geographic location of the computing device based at least in part on the geographic information;
access geographic policy information for the user, wherein:
the geographic policy information is indicative of one or more rules for controlling access to the user's one or more associated computing resources of the provider network based on the determined approximate geographic location of the computing device,
the one or more rules are indicative of security levels based on at least a first proximity and a second proximity relative to the determined approximate geographic location of the computing device, the first proximity being greater than the second proximity, and wherein a first security level is associated with the first proximity and a second security level is associated with the second proximity, and
the geographic policy information is based on preferences selected by the user;
determine that the user is authorized to access the one or more requested computing resources based at least in part on the approximate geographic location of the computing device and the geographic policy information; and
allow access to the one or more requested computing resources in response to the determining that the user is authorized.

2. The system according to claim 1, wherein the geographic policy information indicates a minimum confidence level associated with the approximate geographic location.

3. The system according to claim 1, wherein the geographic policy information indicates restrictions associated with accessing the one or more requested computing resources based on the approximate geographic location.

4. The system according to claim 1, wherein the geographic policy information indicates that the user is authorized to access the one or more requested computing resources when the approximate geographic location is in an allowable location and a confidence level associated with the approximate geographic location is greater than a predetermined threshold.

5. In a computing environment comprising one or more computing nodes providing computing resources, a method comprising:
processing a request received from a computing device associated with a user, the request for access to one or more of the computing resources;
determining an approximate geographic location of the computing device based at least in part on geographic information usable to derive the approximate geographic location of the computing device;
assigning a confidence weight to the geographic information, wherein geographic information from a provider verifiable source is assigned a higher confidence weight than geographic information from other sources; and
allowing access to the requested one or more of the computing resources based at least in part on the approximate geographic location of the computing device and geographic policy information for the user, wherein:

the geographic policy information is indicative of one or more rules for controlling access to the requested one or more of the computing resources based on the approximate geographic location of the computing device, the one or more rules are indicative of security levels based on at least a first proximity and a second proximity relative to the approximate geographic location of the computing device, the first proximity being greater than the second proximity, and wherein a first security level is associated with the first proximity and a second security level is associated with the second proximity, and the geographic policy information is based on preferences selected by the user.

6. The method of claim 5, further comprising determining that the user is authorized to access the requested one or more of the computing resources.

7. The method of claim 5, wherein the geographic information is provided by the computing device.

8. The method of claim 7, wherein the geographic information is one or more of GPS data, access point location data, street address information, and base station location data.

9. The method of claim 5, wherein the geographic policy information indicates a minimum confidence level associated with the approximate geographic location.

10. The method of claim 5, wherein the geographic policy information indicates restrictions associated with accessing the requested one or more of the computing resources based on the approximate geographic location.

11. The method of claim 10, wherein the restrictions comprise denying at least one of a request to complete a purchase transaction, a request to change a user setting, and a request to access stored user information.

12. The method of claim 10, wherein the restrictions comprise requiring a challenge response in order to access the requested one or more of the computing resources.

13. The method of claim 10, wherein the restrictions comprise restricting a manner of accessing the requested one or more of the computing resources.

14. The method of claim 10, wherein the geographic policy information indicates restrictions associated with accessing the requested one or more of the computing resources based on the approximate geographic location being within a predetermined geographic perimeter.

15. The method of claim 10, wherein the geographic policy information indicates restrictions associated with accessing the requested one or more of the computing resources based on the approximate geographic location being proximate to one or more user selected locations.

16. The method of claim 5, wherein the geographic policy information indicates that the user is authorized to access the requested one or more of the computing resources when the approximate geographic location is in an allowable location and a confidence level associated with the approximate geographic location is greater than a predetermined threshold.

17. A non-transitory computer-readable storage medium having stored thereon computer-readable instructions, the computer-readable instructions comprising instructions that upon execution on one or more computing devices, at least cause the one or more computing devices to:

generate an interface allowing submission of user preferences usable to generate geographic policy information for allowing a user to access a computing resource of a provider network, wherein:

the geographic policy information is indicative of restrictions associated with permitting access to the computing resource based on an approximate geographic location of a computing device requesting access to the computing resource, and the geographic policy information is indicative of security levels based on at least a first proximity and a second proximity relative to the approximate geographic location of the computing device, the first proximity being greater than the second proximity, and wherein a first security level is associated with the first proximity and a second security level is associated with the second proximity;

store the geographic policy information; and allow or deny access to the computing resource based at least in part on the geographic policy information and the approximate geographic location of the computing device, wherein the approximate geographic location of the computing device geographic is derived using geographic location information for which a confidence weight is assigned, and wherein geographic information from a provider verifiable source is assigned a higher confidence weight than geographic information from other sources.

18. The non-transitory computer-readable medium of claim 17, wherein the allowing or the denying is further based on the approximate geographic location of the computing device being determined within a minimum confidence level.

19. The non-transitory computer-readable medium of claim 18, wherein the geographic policy information indicates that access to the computing resource is allowable when the approximate geographic location is within a predetermined geographic area.

* * * * *